United States Patent
Itoh et al.

(10) Patent No.: US 7,512,709 B2
(45) Date of Patent: Mar. 31, 2009

(54) ADDRESS RESTRICTION METHOD, ADDRESS RESTRICTION PROGRAM, AND ADDRESS RESTRICTION APPARATUS

(75) Inventors: Fumiaki Itoh, Kanagawa (JP); Haruyuki Kitawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1065 days.

(21) Appl. No.: 10/729,008

(22) Filed: Dec. 8, 2003

(65) Prior Publication Data

US 2004/0148412 A1   Jul. 29, 2004

(30) Foreign Application Priority Data

Jan. 7, 2003   (JP)   ............................. 2003-001169

(51) Int. Cl.
*G06F 15/16* (2006.01)
*G06F 15/173* (2006.01)
(52) U.S. Cl. ...................................... 709/245; 709/238
(58) Field of Classification Search ................ 709/220, 709/238, 245

See application file for complete search history.

(56) References Cited

U.S. PATENT DOCUMENTS

| | | | | |
|---|---|---|---|---|
| 5,708,654 | A * | 1/1998 | Arndt et al. | 370/242 |
| 5,812,819 | A * | 9/1998 | Rodwin et al. | 703/23 |
| 5,935,245 | A * | 8/1999 | Sherer | 726/13 |
| 5,982,753 | A * | 11/1999 | Pendleton et al. | 370/252 |
| 6,393,484 | B1 * | 5/2002 | Massarani | 709/227 |
| 6,704,789 | B1 * | 3/2004 | Ala-Laurila et al. | 709/230 |
| 2002/0016858 | A1 * | 2/2002 | Sawada et al. | 709/238 |
| 2002/0062485 | A1 * | 5/2002 | Okano et al. | 725/111 |
| 2003/0041167 | A1 * | 2/2003 | French et al. | 709/238 |

* cited by examiner

*Primary Examiner*—William C Vaughn, Jr.
*Assistant Examiner*—Ranodhi N Serrao
(74) *Attorney, Agent, or Firm*—Fitzpatrick, Cella, Harper & Scinto

(57) ABSTRACT

A router obtains a network address generated by a PC connected to a LAN, and the identification data (MAC address) unique to the PC. When the obtained network address does not match the network address (EUI-64) generated from the obtained identification data unique to the PC according to a predetermined rule, the router sends a collision message.

12 Claims, 4 Drawing Sheets

ADDRESS RESTRICTION METHOD, ADDRESS RESTRICTION PROGRAM, AND ADDRESS RESTRICTION APPARATUS

BACKGROUND OF THE INVENTION

1. Field of the Invention

The present invention relates to address restriction methods, address restriction programs, and address restriction apparatuses which restrict addresses to be used.

2. Description of the Related Art

As a communication protocol used for the Internet, the use of Internet Protocol Version 6 (IPv6) has been started. IPv6 uses addresses 128 bits long. In the current general use, the higher-order 64 bits indicate data used mainly for identifying a path between routers, and are called a prefix. The prefix is reported mainly by a router to each apparatus in a link managed by the router, and the apparatus sets the higher-order 64 bits of its address to the prefix. Addresses, such as link local addresses used only for communications in the link, other than these addresses are actually used, but a description thereof is omitted here. The lower-order 64 bits indicate data used freely by each apparatus, and are called an interface ID.

As a general method for each apparatus to generate the interface ID, there is a method called a 64-bit extended unique identifier (EUI-64) for generating a 64-bit address. When the link is structured by an Ethernet, for example, the medium access control address (MAC-48) of the apparatus is divided into two parts each having three bytes, "ff:fe" is inserted between the parts, and, in the most significant byte, a bit masked by "02" is inverted to generate a 64-bit interface ID. When the apparatus has an MAC-48 of 00:80:90:a0:b0:c0, for example, the interface ID is 0280:90ff:feao:b0c0. For simplicity, the term apparatus has been used, but strictly speaking, it means a network interface of an apparatus.

Since any method for generating an interface ID can be used, there is no guarantee that the interface ID generated by the above-described method is unique in the link. Therefore, a link local address employing this interface ID is used as a tentative address, and whether another apparatus is using the same address as the tentative address in the same link is checked. This is performed by issuing a message inquiring of a multi-cast address called a request multi-cast whether another apparatus is using the tentative address. The request multi-cast is obtained by taking logical OR of "ff02::1:ff00:0000" and the lower-order 24 bits of the tentative address. When the interface ID has the value described above, the request multi-cast is "ff02::1:ffa0:b0c0".

When another apparatus is using the tentative address, it issues a message indicating that the tentative address is being used. If a message indicating that the tentative address is being used is not issued, the apparatus officially starts using the interface ID in the tentative address. If a message indicating that the tentative address is being used is issued, another interface ID is assigned.

The interface ID is not necessarily required to be generated by the EUI-64 method based on the MAC address. Another method may be used to generate the interface ID.

SUMMARY OF THE INVENTION

It is an object of the present invention to forbid addresses generated by a method which a network administrator does not prefer, to be used.

The foregoing object is achieved in one aspect of the present invention through the provision of an address restriction method including the steps of obtaining an address generated by an apparatus connected to a network and identification data unique to the apparatus, determining whether the obtained address has been generated from the obtained identification data unique to the apparatus, and sending a message forbidding the use of the obtained address according to the result of the determining step.

The foregoing object is achieved in another aspect of the present invention through the provision of an address restriction program including the steps of obtaining an address generated by an apparatus connected to a network and identification data unique to the apparatus, determining whether the obtained address has been generated from the obtained identification data unique to the apparatus, and sending a message forbidding the use of the obtained address according to the result of the determining step.

The foregoing object is achieved in yet another aspect of the present invention through the provision of an address restriction apparatus including connection means for connecting to a network and for obtaining an address generated by a device connected to the network and identification data unique to the device, and determination means for determining whether the obtained address has been generated from the obtained identification data unique to the device, wherein, the connection means sends a message forbidding the use of the obtained address according to the result of the determination means.

Further objects, features and advantages of the present invention will become apparent from the following description of the preferred embodiments with reference to the attached drawings.

DESCRIPTION OF THE PREFERRED EMBODIMENTS

First Embodiment

Figure 1:
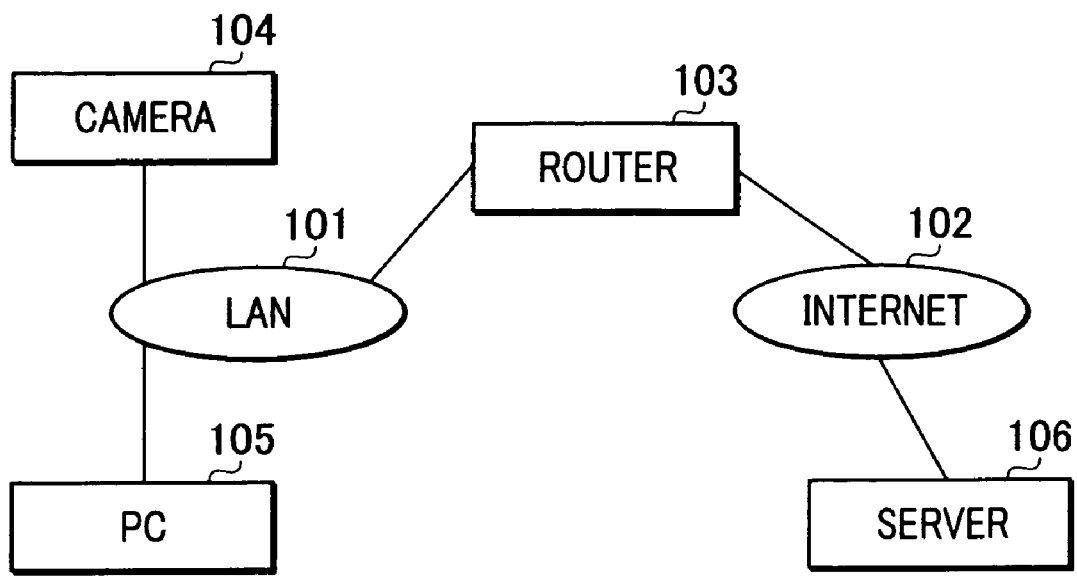
FIG. 1 is a view showing a use example of a network using an apparatus according an embodiment of the present invention.

A first embodiment of the present invention will be described below in detail by referring to the drawings.

FIG. 1 is a view showing a use example of an IPv6 network using an address reservation apparatus according to the present embodiment. In FIG. 1, a LAN 101 is structured by an Ethernet, and is one IPv6 link. The address reservation apparatus (address restriction apparatus) 103 according to the present embodiment also functions as a router relaying between the LAN 101 and the Internet 102. A camera 104 has a network interface for the Ethernet. When the camera 104 is connected to the LAN 101, its interface ID is generated by an EUI-64 method. A PC 105 has a network interface for the Ethernet. When the PC 105 is connected to the LAN 101, its interface ID is generated by a method other than the EUI-64 method, and is, for example, a random number. A server 106, to which the camera 104 uploads images, is connected to the Internet 102.

Since the PC 105 generates its interface ID by a method other than the EUI-64 method, when the camera 104 is connected to the LAN 101 while the PC 105 is being connected to the LAN 101, an interface ID generated by the camera 104 may collide with the interface ID which the PC 105 is using. The router 103, serving as the address reservation apparatus (address restriction apparatus) according to the present embodiment, reserves interface IDs which the camera 104 may use, and, when the PC 105 generates one of the reserved interface IDs, the router 103 shows to the PC 105 as if the generated interface ID collided with the used interface ID and prevents the PC 105 from using the reserved interface ID.

The router 103 serving as the address reservation apparatus according to the present embodiment will be described below in detail.

Figure 2:
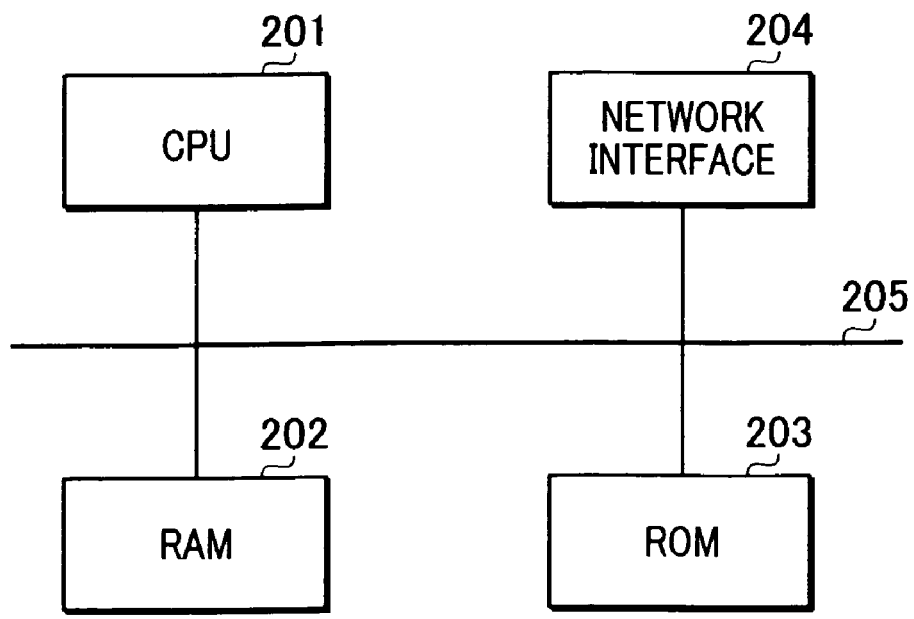
FIG. 2 is a view showing the hardware structure of a router serving as an address reservation apparatus according to the embodiment of the present invention.

FIG. 2 is a view showing the hardware structure of the router 103 serving as the address reservation apparatus according to the present embodiment.

In FIG. 2, a CPU 201 executes a program described below. A RAM 202 provides an area required for the operation of the program. A ROM 203 stores the program and holds permanent data required for other operations. A network interface 204 includes an Ethernet interface connected to the LAN 101, and an interface connected to the Internet 102. The LAN-side network interface 204 of the router 103 according to the present embodiment is set so as to receive any request multicast. When it is a message inquiring the collision of a tentative address, the CPU 201 executes a collision detection processing program, described next.

The collision detection processing program is stored in the ROM 203. The router 103 also executes programs for implementing general router functions.

The collision detection processing program executes an address reservation process in which a network address generated by an apparatus connected to the network 101 and the identification data (MAC address) unique to the apparatus are obtained, and if the obtained network address is not the network address generated according to a predetermined rule from the obtained identification data unique to the apparatus, a message rejecting the obtained network address is transmitted.

The network interface 204 is acquisition means for acquiring a network address (tentative address) generated by each apparatus (for example, the PC 105) connected to the network 101 and the identification data (MAC address) unique to the apparatus (for example, the PC 105). The network address conforms to Internet Protocol Version 6 (IPv6). A collision inquiring message includes a network address generated by the transmission source (for example, the PC 105). The network interface 204 also has a function for obtaining the identification data (MAC address) unique to the transmission source. The identification data (MAC address) unique to the transmission source is also included in the received message.

When the network address obtained by the network interface 204 is not the network address (EUI-64) generated according to the predetermined rule from the identification data (MAC address) unique to the apparatus (for example, the PC 105) obtained by the network interface 204, the CPU 201 serves as message transmission means for transmitting a message (collision message) rejecting the network address obtained by the network interface 204. The network address generated according to the predetermined rule from the identification data unique to the apparatus is, for example, a network address conforming to the 64-bit extended unique identifier (EUI-64) format.

When the obtained network address falls in the space (in other words, has a predetermined value ("fffe") at a predetermined position (the fifth and fourth bytes from the LSB) of the address) of network addresses (EUI-64) generated according to the predetermined rule from the identification data (MAC address) unique to apparatuses (for example, the PC 105) obtained by the network interface 204, but the obtained network address is not a network address (EUI-64) generated according to the predetermined rule from the identification data (MAC address) unique to the apparatus obtained by the network interface 204, the CPU 201 transmits a message (collision message) rejecting the obtained network address.

In the present embodiment, although a network address which does not fall in the space (in other words, does not have the predetermined value (fffe) at the predetermined position (the fifth and fourth bytes from the LSB) of the address) of the network addresses (EUI-64) generated according to the predetermined rule from the identification data (MAC addresses) unique to the apparatuses does not match any network address (EUI-64) generated according to the predetermined rule, it is not rejected as an exception.

Whether the network address (EUI-64) obtained by the network interface 204 falls in the space of the network addresses (EUI-64) generated according to the predetermined rule from the obtained identification data (MAC address) unique to the apparatuses is determined by comparing the value at the fixed data area (predetermined position) of the network address (EUI-64) with the predetermined value ("fffe").

The processing procedure of the collision detection processing program executed by the router 103 will be described next by referring to FIG. 3.

Figure 3:
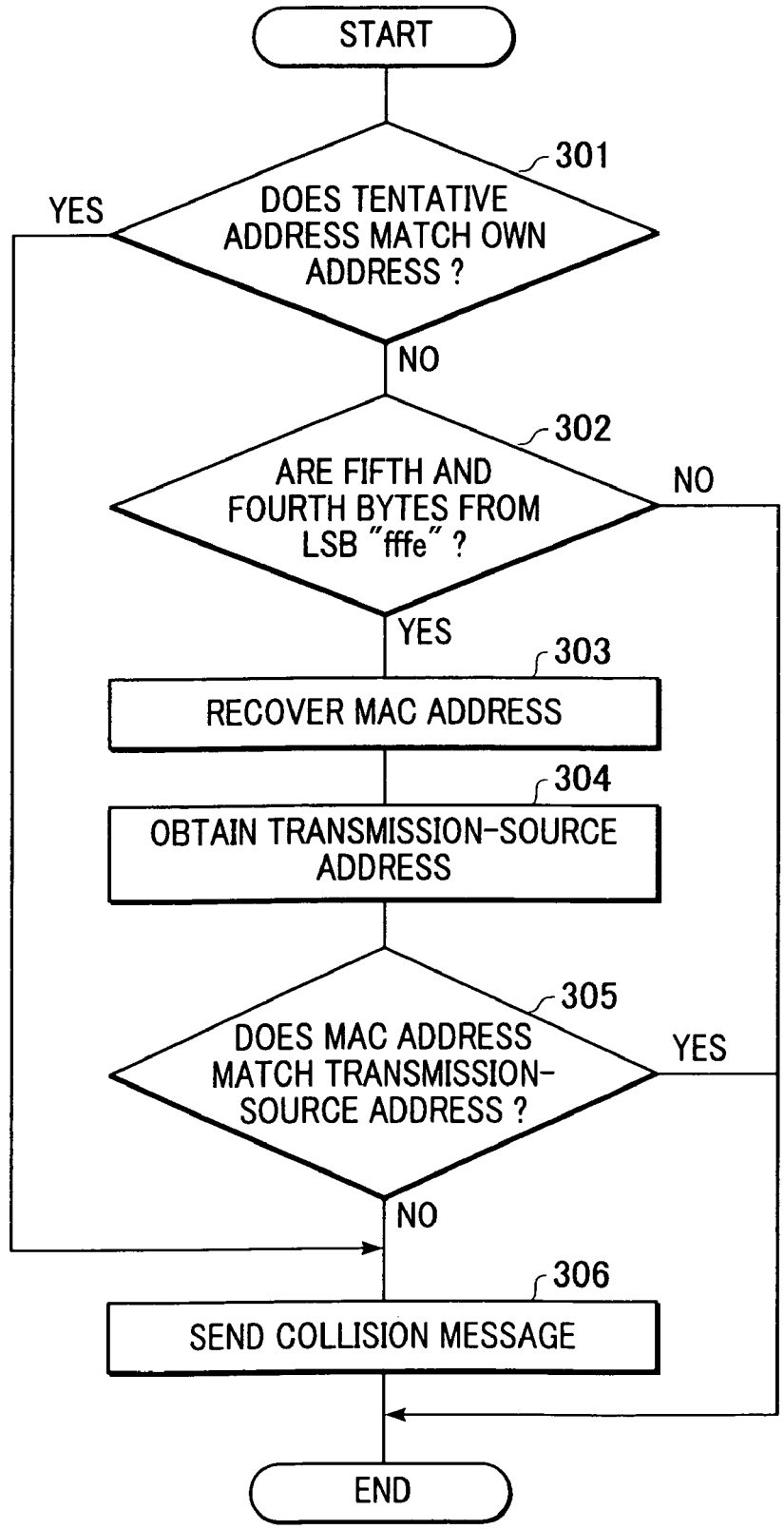
FIG. 3 is a flowchart showing a collision detection processing according to the embodiment of the present invention.

In FIG. 3, in step 301, the tentative address (the network address generated by the PC 105) included in a received inquiry message is obtained, and it is determined whether the tentative address matches the link local address of the LAN-side network interface 204 of the router 103. When they match, the processing proceeds to step 306. When they do not match, the processing proceeds to step 302.

In step 302, it is determined whether the fifth and the fourth bytes from the LSB of the tentative address are "fffe". When they are not "fffe", the processing is terminated. When they are "fffe", the processing proceeds to step 303. In the process of step 302, it is determined whether the tentative address falls in the space of the network addresses generated according to the predetermined rule from the identification data (MAC addresses) unique to the apparatuses obtained by the network interface 204. When the fifth and the fourth bytes (predetermined position) from the LSB of the tentative address are "fffe" (predetermined value), it is determined that the tentative address falls in the space of the network addresses (EUI-64) generated according to the predetermined rule from the MAC addresses. The fifth and the fourth bytes (predetermined position) from the LSB of the tentative address indicate the area of fixed data in the network address (EUI-64). In step 302, the value in the data area of the tentative address is compared with the predetermined value.

In step 303, the MAC address is recovered from the tentative address by the following process. The lower-order three bytes of the tentative address are saved. Then, the tentative address is shifted to the right by three bytes to make the lower-order three bytes to zero. The logical OR of this value and the saved lower-order three bytes is taken. Then, the result and "02:00:00:00:00:00" are exclusive-ORed, and the lower-order six bytes are used as the recovered MAC address. Then, the processing proceeds to step 304.

In step 304, the Ethernet address of the transmission source of the request multi-cast received by the network interface 204 is obtained. Then, the processing proceeds to step 305.

In step 305, the recovered MAC address recovered in step 303 is compared with the Ethernet address of the transmission source obtained in step 304. When they match, the processing is terminated. When they do not match, the processing proceeds to step 306.

In step 306, a message indicating that the tentative address has a collision (has already been used) is transmitted to the LAN 101 in response to the inquiry transmitted by the request multi-cast. Then, the processing is terminated. This collision message is a management message rejecting the tentative address. The collision message is sent to the LAN 101 from the network interface 204. In other words, when the network address (tentative address) obtained by the network interface 204 is not the network address (EUI-64) generated according to the predetermined rule from the identification data unique to the apparatus obtained by the network interface 204, a message rejecting the network address (tentative address) generated by the apparatus (PC 105) is transmitted.

In the present embodiment, the MAC address is recovered from the tentative address (in step 303) and is compared with the Ethernet address of the transmission source (in step 305). The interface ID may be generated from the Ethernet address of the transmission source according to EUI-64 and compared with the interface ID of the tentative address.

Figure 4:
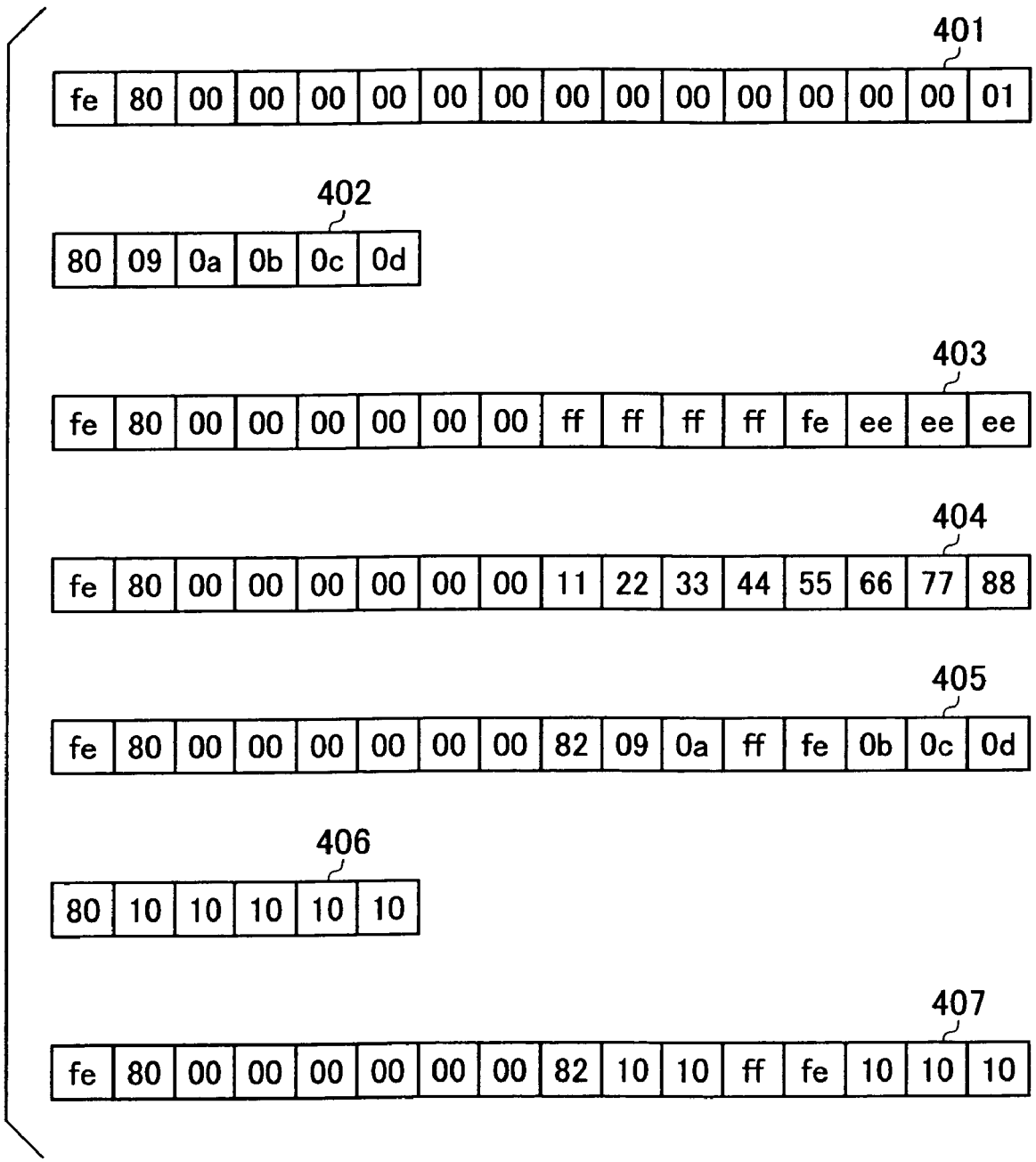
FIG. 4 is a view showing a processing example according to the embodiment of the present invention.

An operation example will be described next by referring to FIG. 4. An address 401 is the link address of the LAN-side network interface 204 of the router 103. This interface ID is any address which is found not to collide with the interface IDs of other apparatuses generated by EUI-64 in processing similar to the above-described processing. An address 402 is the MAC address of the PC 105. An address 403 is an example tentative address generated from an interface ID generated by the PC 105 in a random manner.

When the PC 105 sends a request multi-cast inquiring a collision with this tentative address 403, since the fifth and fourth bytes from the LSB of the tentative address are "fffe" and the MAC address recovered from the tentative address 403 differs from the MAC address of the PC 105, which is the transmission source of the request multi-cast, the router 103 transmits a collision message. Therefore, the PC 105 does not use this tentative address 403.

An address 404 is a tentative address using another interface ID generated by the PC 105 in a random manner. In this case, since the fifth and fourth bytes from the LSB of the tentative address are not "fffe", the router 103 does not send a collision message. The PC 105 will use this tentative address officially.

An address 405 is the tentative address used when the interface ID is generated from the MAC address according to EUI-64 by the PC 105. Since the fifth and fourth bytes from the LSB of the tentative address 405 are "fffe" and the MAC address recovered from the tentative address 405 matches the MAC address of the PC 105, which is the transmission source of the request multi-cast, the router 103 does not send a collision message. The PC 105 will use this tentative address officially. When an interface ID generated by the PC 105 in a random manner is the tentative address 405, no problem occurs.

An address 406 is the MAC address of the camera 104. The camera 104 always generates the interface ID according to EUI-64. Therefore, the generated tentative address is always an address 407. Even when a collision-inquiry request multi-cast is sent with this tentative address, the router does not send a collision message. With the operations of the router 103 performed so far, it is guaranteed that there is no apparatus which uses this tentative address as an official link local address, because an MAC address is uniquely assigned to an apparatus.

The camera 104 uses an address to which the prefix given by the router 103 is attached to access the server 106. Even in this case, the interface ID is the same as the link local address. With this, when the server 106 has data indicating the relationship between MAC addresses and models, for example, the server 106 can identify the model of the camera 104 only by the IP address, and can send, for example, the revision information of firmware.

Second Embodiment

A second embodiment of the present invention will be described next.

The present embodiment is the same as the first embodiment in the use example of the IPv6 network using the address reservation apparatus, in the hardware structure of the address reservation apparatus, and in the process for activating a collision detection processing program described next.

A network interface 204 is acquisition means for acquiring a network address (tentative address) generated by each apparatus (for example, a PC 105) connected to a network and the identification data (MAC address) unique to the apparatus (for example, the PC 105). The network address conforms to Internet Protocol Version 6 (IPv6). A collision inquiring message includes a network address generated by the transmission source (for example, the PC 105). The network interface 204 also has a function for obtaining the identification data (MAC address) unique to the transmission source. The identification data (MAC address) unique to the transmission source is also included in the received message.

When the network address obtained by the network interface 204 is not the network address (EUI-64) generated according to a predetermined rule from the identification data (MAC address) unique to the apparatus (for example, the PC 105) obtained by the network interface 204, a CPU 201 serves as message transmission means for transmitting a message (collision message) rejecting the network address obtained by the network interface 204. The network address generated according to the predetermined rule from the identification data unique to the apparatus is, for example, a network address conforming to the 64-bit extended unique identifier (EUI-64) format.

In the present embodiment, even when a network address obtained by the network interface 204 does not fall in the space (in other words, does not have a predetermined value (fffe) at a predetermined position (the fifth and fourth bytes from the LSB) of the address) of network addresses (EUI-64) generated according to the predetermined rule from the identification data (MAC addresses) unique to apparatuses, the CPU 201 transmits a message (collision message) rejecting the network address obtained by the network interface 204.

Whether the network address (EUI-64) obtained by the network interface 204 falls in the space of the network addresses (EUI-64) generated according to the predetermined rule from the obtained identification data (MAC address) unique to the apparatuses is determined by comparing the value at the fixed data area (predetermined position) of the network address (EUI-64) with the predetermined value ("fffe").

The processing procedure of a collision detection processing program executed by a router 103 will be described next by referring to FIG. 5.

Figure 5:
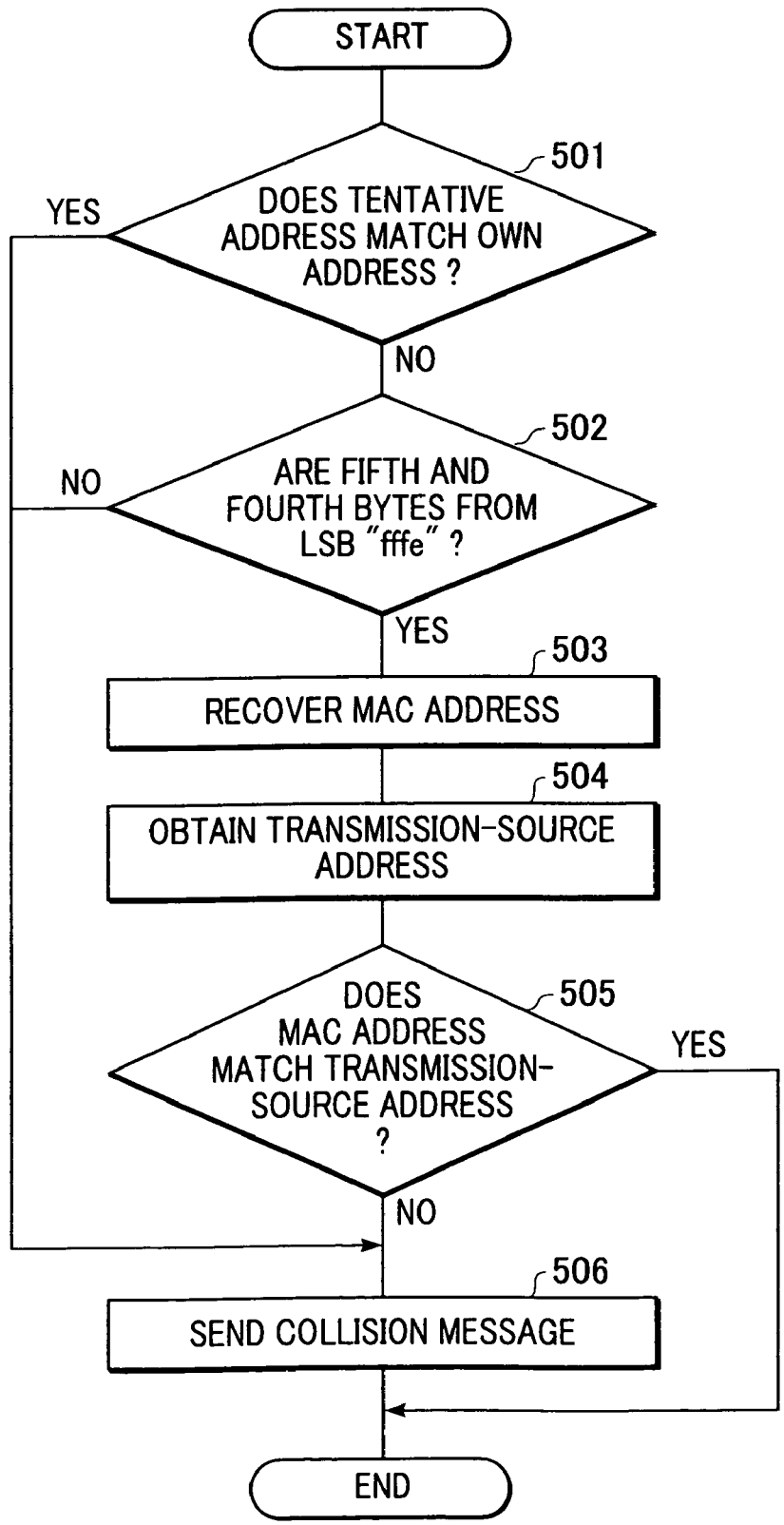
FIG. 5 is a view showing a collision detection processing according to another embodiment of the present invention.

In FIG. 5, in step 501, it is determined whether the tentative address included in a received inquiry message matches the link local address of the LAN-side network interface 204 of the router 103. When they match, the processing proceeds to step 506. When they do not match, the processing proceeds to step 502.

In step 502, it is determined whether the fifth and the fourth bytes from the LSB of the tentative address are "fffe". When they are not "fffe", the processing proceeds to step 506. When they are "fffe" in step 502, the processing proceeds to step 503. In the process of step 502, it is determined whether the tentative address falls in the space of the network addresses generated according to the predetermined rule from the identification data (MAC addresses) unique to the apparatuses obtained by the network interface 204.

In the present embodiment, when the fifth and the fourth bytes from the LSB of the tentative address are not "fffe" in step 502, it is determined that the network address (tentative address) obtained by the network interface 204 is not the network address (EUI-64) generated according to the predetermined rule from the identification data (MAC address) unique to the apparatus (for example, the PC 105) obtained by the network interface 204.

In step 503, the MAC address is recovered from the tentative address by the following process. The lower-order three bytes of the tentative address are saved. Then, the tentative address is shifted to the right by three bytes to make the lower-order three bytes to zero. The logical OR of this value and the saved lower-order three bytes is taken. Then, the result and "02:00:00:00:00:00" are exclusive-ORed, and the lower-order six bytes are used as the recovered MAC address. Then, the processing proceeds to step 504.

In step 504, the Ethernet address of the transmission source of the request multi-cast received by the network interface 204 is obtained. Then, the processing proceeds to step 505.

In step 505, the recovered MAC address recovered in step 503 is compared with the Ethernet address of the transmission source obtained in step 504. When they match, the processing is terminated. When they do not match, the processing proceeds to step 506.

In step 506, a message indicating that the tentative address has a collision (has already been used) is transmitted to the LAN 101 in response to the inquiry transmitted by the request multi-cast. Then, the processing is terminated. This collision message is a management message rejecting the tentative address. The collision message is sent to the LAN 101 from the network interface 204. In other words, when the network address (tentative address) obtained by the network interface 204 is not the network address (EUI-64) generated according to the predetermined rule from the identification data unique to the apparatus obtained by the network interface 204, a message rejecting the network address (tentative address) generated by the apparatus (PC 105) is transmitted.

In the present embodiment, the MAC address is recovered from the tentative address (in step 503) and is compared with the Ethernet address of the transmission source (in step 505). The interface ID may be generated from the Ethernet address of the transmission source according to EUI-64 and compared with the interface ID of the tentative address.

An operation example will be described next by referring to FIG. 4. An address 401 is the link address of the LAN-side network interface 204 of the router 103. An address 402 is the MAC address of the PC 105. An address 403 is an example tentative address generated from an interface ID generated by the PC 105 in a random manner.

When the PC 105 sends a request multi-cast inquiring collision with this tentative address 403, since the fifth and fourth bytes from the LSB of the tentative address 403 are "fffe" and the MAC address recovered from the tentative address 403 differs from the MAC address of the PC 105, which is the transmission source of the request multi-cast, the router 103 transmits a collision message. Therefore, the PC 105 does not use this tentative address 403.

An address 404 is a tentative address using another interface ID generated by the PC 105 in a random manner. In this case, since the fifth and fourth bytes from the LSB of the tentative address 404 are not "fffe", which means that the tentative address 404 does not have an interface ID generated according to EUI-64, the router 103 sends a collision message.

An address 405 is the tentative address used when the interface ID is generated from the MAC address according to EUI-64 by the PC 105. In this case, since the fifth and fourth bytes from the LSB of the tentative address 405 are "fffe" and the MAC address recovered from the tentative address 405 matches the MAC address of the PC 105, which is the transmission source of the request multi-cast, the router 103 does not send a collision message. The PC 105 will use this tentative address officially. The same conditions applies to an address 407 for the camera 104. Therefore, the camera 104 uses an address to which the prefix given by the router 103 is attached to access the server 106. Even in this case, the interface ID is the same as the link local address. With this, when the server 106 has data indicating the relationship between MAC addresses and models, for example, the server 106 can identify the model of the camera 104 only by the IP address, and can send, for example, the revision information of firmware.

Other Embodiments

In the above-described embodiments, the MAC address is recovered from the tentative address. The network address (EUI-64) may be generated according to the predetermined rule from the MAC address of a transmission source and compared with the tentative address.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions. For example, in the above-described embodiments, the address reservation apparatus also serves as the router. The address reservation apparatus may be an independent apparatus always connected to a network. The address reservation apparatus may be integrated with another apparatus.

In the above-described embodiments, the interface ID is generated from an MAC address according to EUI-64 in an IPv6 network, in which the link layer is formed of an Ethernet. The present invention is not limited to this case. The present invention is applied to cases where the network address of each apparatus is generated from the identification data unique to the apparatus according to a specific method, and the network addresses generated according to the specific method are a proper subset of all network addresses. In general, when a generated network address falls in the proper subset, but differs from the address generated from the identification data unique to the apparatus according to the specific method, a process for rejecting the network address is performed.

In the above-described embodiments, one network is managed. However, the present invention is not limited to this case, and a plurality of networks may be managed.

In the above-described embodiments, each apparatus has one network interface, and generates one link local address. However, each apparatus may have a plurality of network interfaces, or may generate a plurality of link local addresses. The processing of either of the above-described embodiments can be applied to each network interface or to each link local address to handle it.

In the above-described embodiments, the computer, the CPU, or the MPU is used to operate the software program which implements the above-described functions. However, the whole or part of the functions may be implemented by a logic circuit.

The present invention may also be applied to a system formed of a plurality of units, or to an apparatus formed of one unit. When a recording medium having recorded therein the program code of software which implements the functions in the above-described embodiments is loaded to a system or an apparatus, and the system or a computer (a CPU or an MPU) of the apparatus reads and executes the program code stored in the recording medium, the functions are, of course, implemented. In this case, the program code itself read from the recording medium implements the functions in the above-described embodiments, and the recording medium having recorded therein the program code constitutes the present invention.

As recording media for supplying the program code, floppy disks, hard disks, optical disks, magneto-optical disks, CD-ROMS, CD-Rs, magnetic tapes, non-volatile memory cards, and others can be used in addition to ROMs.

The present invention includes not only a case where a computer executes the read program code to implement the functions of the above-described embodiments, but also a case where the OS and others running on the computer perform the whole or part of actual processing according to the instructions of the program code, and the processing implements the functions of the above-described embodiments.

The present invention also includes a case in which the program code read from a recording medium is written into a memory provided for a function extension board inserted into a computer or into a memory provided for a function extension unit connected to the computer, a CPU and others provided for the function extension board or the function extension unit performs the whole or part of actual processing according to the instructions of the program code, and the processing implements the functions of the above-described embodiments.

What is claimed is:

1. An address restriction method executed by an address restriction apparatus on a network, comprising the steps of:
   obtaining, from a message received from a transmission source device, a tentative network address generated by the transmission source device which is connected to the network, and a local address unique to the transmission source device;
   a first determining step of determining whether the obtained tentative network address is a network address which is within an address range determined according to a predetermined rule and has been generated from the obtained local address unique to the transmission source device;
   a second determining step of determining whether the obtained tentative network address matches an address of a connection means which connects the address restriction apparatus to the network;
   in a case where the first determining step determines that the tentative network address is the network address which is not within the address range determined according to the predetermined rule, sending a message to the transmission source device forbidding the use of the obtained tentative network address;
   in a case where the first determining step determines that the tentative network address is the network address which is within the address range determined according to the predetermined rule and has been generated from the obtained local address unique to the transmission source device, permitting the transmission source device to use the tentative network address for performing communication on the network;
   in a case where the first determining step determines that the tentative network address is the network address which is within the address range determined according to the predetermined rule but has not been generated from the obtained local address unique to the transmission source device, sending a message to the transmission source device forbidding the use of the obtained tentative network address; and
   in a case where the second determining step determines that the obtained tentative network address matches the address of the connection means, sending the message to the transmission source device forbidding the use of the obtained tentative network address.

2. The address restriction method according to claim 1, wherein said first determining step determines whether the obtained tentative network address includes predetermined data.

3. The address restriction method according to claim 1, wherein said obtaining step obtains a MAC address of a network interface provided for the transmission source device, as the local address unique to the transmission source device.

4. The address restriction method according to claim 1, wherein said sending step sends a message indicating that the tentative network address has a collision.

5. A computer-readable storage medium on which is stored an address restriction program executed by an address restriction apparatus on a network, the program comprising the steps of:
   obtaining, from a message received from a transmission source device, a tentative network address generated by the transmission source device which is connected to the network, and a local address unique to the transmission source device;
   a first determining step of determining whether the obtained tentative network address is a network address which is within an address range determined according to a predetermined rule and has been generated from the obtained local address unique to the transmission source device;
   a second determining step of determining whether the obtained tentative network address matches an address of a connection means which connects the address restriction apparatus to the network;
   in a case where the first determining step determines that the tentative network address is the network address which is not within the address range determined according to the predetermined rule, sending a message to the transmission source device forbidding the use of the obtained tentative network address;

in a case where the first determining step determines that the tentative network address is the network address which is within the address range determined according to the predetermined rule and has been generated from the obtained local address unique to the transmission source device, permitting the transmission source device to use the tentative network address for performing communication on the network;

in a case where the first determining step determines that the tentative network address is the network address which is within the address range determined according to the predetermined rule but has not been generated from the obtained local address unique to the transmission source device, sending a message to the transmission source device forbidding the use of the obtained tentative network address; and in a case where the second determining step determines that the obtained tentative network address matches the address of the connection means, sending the message to the transmission source device forbidding the use of the obtained tentative network address.

6. The computer-readable storage medium according to claim 5, wherein said first determining step determines whether the tentative network obtained address includes predetermined data.

7. The computer-readable storage medium according to claim 5, wherein said obtaining step obtains a MAC address of a network interface provided for the transmission source device, as the local address unique to the transmission source device.

8. The computer-readable storage medium according to claim 5, wherein said sending step sends a message indicating that the tentative network address has a collision.

9. An address restriction apparatus connected to a network, wherein said address restriction apparatus includes a processor and a memory unit, comprising:

connection means for connecting the apparatus to the network and for obtaining, from a message received from a transmission source device, a tentative network address generated by the transmission source device which is connected to the network, and a local address unique to the transmission source device;

determination means for performing a first determination of determining whether the obtained tentative network address is a network address which is within an address range determined according to a predetermined rule and has been generated from the obtained local address unique to the transmission source device, and a second determination of determining whether the obtained tentative network address matches an address of the connection means;

wherein, in a case where the first determination by the determination means determines that the tentative network address is the network address which is not within the address range determined according to the predetermined rule, said connection means sends a message to the transmission source device forbidding the use of the obtained tentative network address;

in a case where the first determination by the determination means determines that the tentative network address is the network address which is within the address range determined according to the predetermined rule and has been generated from the obtained local address unique to the transmission source device, the connection means permits the transmission source device to use the tentative network address for performing communication on the network;

in a case where the first determination by the determination means determines that the tentative network address is the network address which is within the address range determined according to the predetermined rule but has not been generated from the obtained local address unique to the transmission source device, said connection means sends a message to the transmission source device forbidding the use of the obtained tentative network address; and in a case where the second determination by the determination means determines that the obtained tentative network address matches the address of the connection means, said connection means sends the message to the transmission source device forbidding the use of the obtained tentative network address.

10. The address restriction apparatus according to claim 9, wherein in the first determination, said determination means determines whether the obtained tentative network address includes predetermined data.

11. The address restriction apparatus according to claim 9, wherein said connection means obtains a MAC address of a network interface provided for the transmission source device, as the local address unique to the transmission source device.

12. The address restriction apparatus according to claim 9, wherein said connection means sends a message indicating that the obtained tentative network address has a collision.

* * * * *